United States Patent
Meredith

[15] 3,662,330
[45] May 9, 1972

[54] FAIL-SAFE VEHICLE DETECTOR SYSTEM

[72] Inventor: Gary L. Meredith, Anaheim, Calif.
[73] Assignee: Tamar Electronics Industries, Inc., Anaheim, Calif.
[22] Filed: Jan. 18, 1971
[21] Appl. No.: 107,017

[52] U.S. Cl. .............................................. 340/38 R, 328/48
[51] Int. Cl. ........................................................ G08g 1/00
[58] Field of Search ...................... 340/38 R, 38 L, 38 S, 38 P

[56] References Cited

UNITED STATES PATENTS 3,406,395  10/1968  Zupanick ............................ 340/38 R
3,350,547  10/1967  Brockett ............................. 340/38 R Primary Examiner—Thomas B. Habecker
Attorney—Sokolski & Wohlgemuth

[57] ABSTRACT

Primary and secondary vehicle sensors are utilized to detect vehicles moving along a roadway, this information being available for use in a traffic control system. Primary and secondary counters associated with the primary and secondary vehicle sensors respectively are driven by a timing pulse source. The counters are reset to zero in response to their associated vehicle sensors so that the maximum count thereon is indicative of the time between successive actuations of such sensors. A timing limit selector is utilized to select a timing interval indicative of a probable failure in the operation of either of the vehicle sensors. This selected timing output is separately compared with the outputs of the counters, and when coincidence between the selected timing output and the output of either of the counters is reached, a failure signal is generated. This failure signal is utilized both to actuate an appropriate fail indicator and to control logical gating circuitry to provide an output signal solely in response to the vehicle sensor not associated with this failure signal.

9 Claims, 3 Drawing Figures

INVENTOR
GARY L. MEREDITH
BY
SOKOLSKI & WOHLGEMUTH
ATTORNEYS

FAIL-SAFE VEHICLE DETECTOR SYSTEM

This invention relates to a vehicle detector system, and more particularly to such a system utilizing redundant sensors which is capable of providing fail-safe operation in the event of failure of one of the sensors.

Vehicle detectors are utilized extensively in traffic control systems to detect the presence and movement of vehicles. Such sensors may be of various types such as those involving mechanical, magnetic or inductive actuation. Many traffic systems inherently depend on the vehicle sensing function for their operation. Thus, for example, systems utilizing an actuated phase of operation will not function properly if the sensors are not operating. Also, certain systems depend for their operation on the measurement of the volume and density of traffic and hence rely on the proper functioning of the vehicle sensing system to provide the raw data for such computations. Thus, it should be apparent that a malfunction in the operation of a vehicle sensor could cause serious disruption of a variety of traffic control functions. Therefore, it is highly desirable particularly on heavily travelled streets to have a back-up sensor which can take over in the event of failure of the primary sensor.

The system of this invention provides means for automatically implementing such take-over by a back-up detection system in the event of failure by the primary, this system utilizing logical digital circuitry in performing its functions.

It is therefore an object of this invention to avoid disruptions in traffic control due to the failure of vehicle sensors.

It is another object of this invention to provide an automatically operable fail-safe vehicle detection system.

It is still another object of this invention to provide a digitally implemented control system for automatically placing a secondary back-up vehicle detection system in operation in the event of failure of the primary system.

Other objects of this invention will become apparent as the description proceeds in connection with the accompanying drawings, of which:

Briefly described, the system of the invention comprises a primary vehicle sensor and an associated detector circuit, counter and comparator, and a secondary vehicle sensor and an associated detector circuit, counter and comparator. Both counters are driven upwardly in response to a timing pulse source. A predetermined time limit is selected by means of a timing limit selector switch, this timing limit corresponding to a timing interval greater than the maximum expected intervals between actuations of the vehicle sensors. Each of the counters is reset to zero in response to the output of its associated vehicle sensor. The output of each of the counters is compared in a comparator circuit with the timing limit set on the timing limit selector switch and when the count on such counter reaches that set on the selector switch, a "fail" signal is generated. This "fail" signal is utilized to actuate a "fail" indicator as well as a logical gating circuit which automatically connects the output of the detector circuit for the other vehicle sensor (the sensor not associated with the fail indication) to the detector circuit output line.

Figure 1:
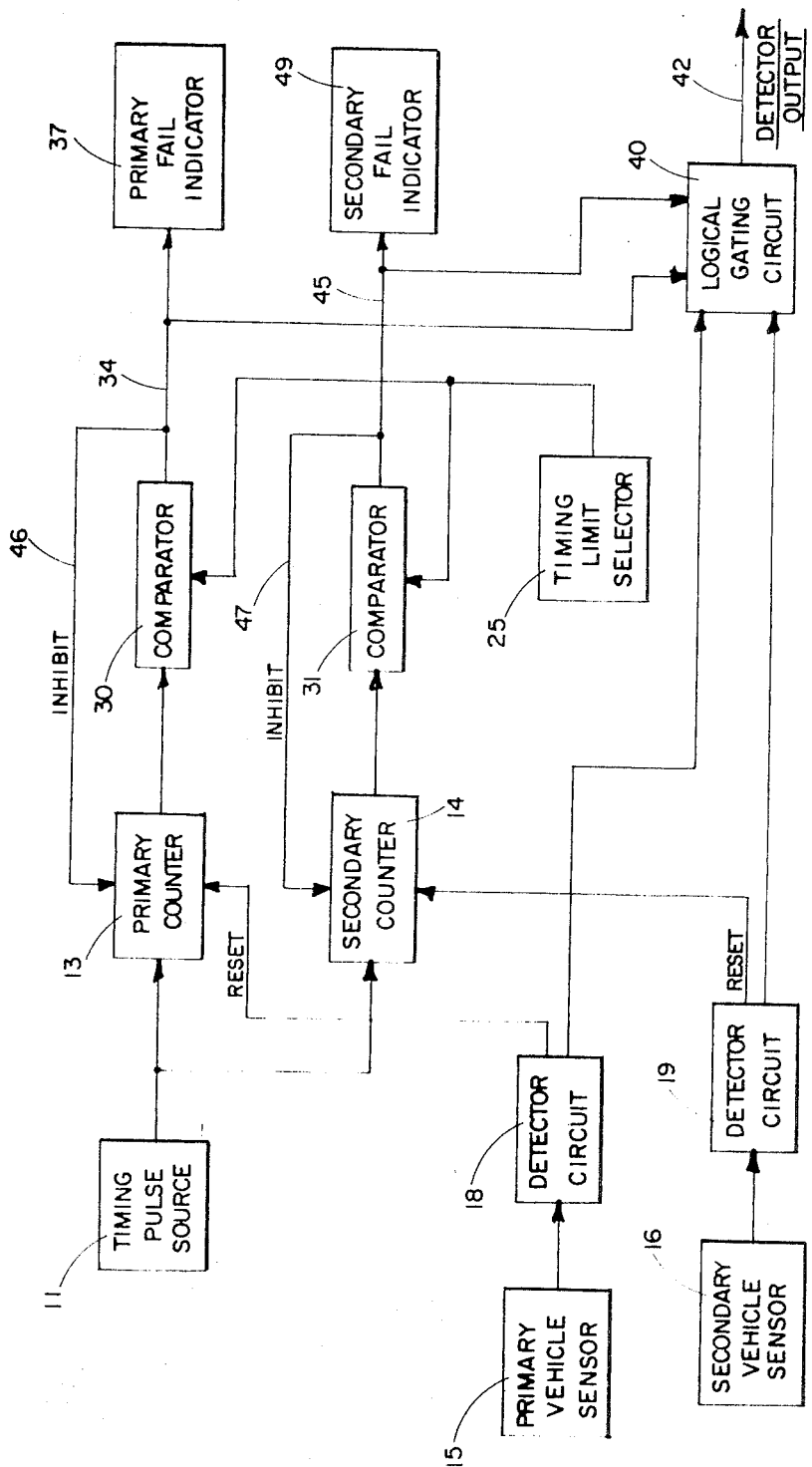
FIG. 1 is a block diagram of one embodiment of the invention.

Referring now to FIG. 1, one embodiment of the system of the invention is schematically illustrated. The output of timing pulse source 11 which typically may be at a timing rate of the order of one pulse per minute, is simultaneously fed to primary counter 13 and secondary counter 14 to successively advance these counters. Counters 13 and 14 may, for example, comprise conventional binary counter circuits having a 100 count capacity. Primary vehicle sensor 15 and secondary vehicle sensor 16 each provide an output signal for each vehicle sensed thereby. These sensors typically may comprise magnetic or inductive sensors imbedded in the roadway. The two sensors are positioned relatively close to each other so that they will respond to the same vehicles and thus provide similar outputs. The outputs of primary vehicle sensor 15 and secondary vehicle sensor 16 are fed to vehicle detector circuits 18 and 19 respectively which are used to provide output signals to the traffic controller in accordance with the traffic conditions. The output of detector circuit 18 is fed to primary counter 13 as a reset signal therefor, while the output of detector circuit 19 is fed to secondary counter 14 to provide a reset signal for this counter. Thus, each time an output is provided from detector circuit 18 and from detector circuit 19 in response to a vehicle, primary counter 13 and secondary counter 14 will be reset to zero and thus will be forced to start a new count in response to timing pulse source 11. Thus, the maximum counts on counters 13 and 14 represent the time interval between a pair of successive vehicle sensings. If, one of the vehicle sensors should fail, the associated counter will, as now to be shown, count up to the count set on timing limit selector 25 without being reset.

Figure 2:
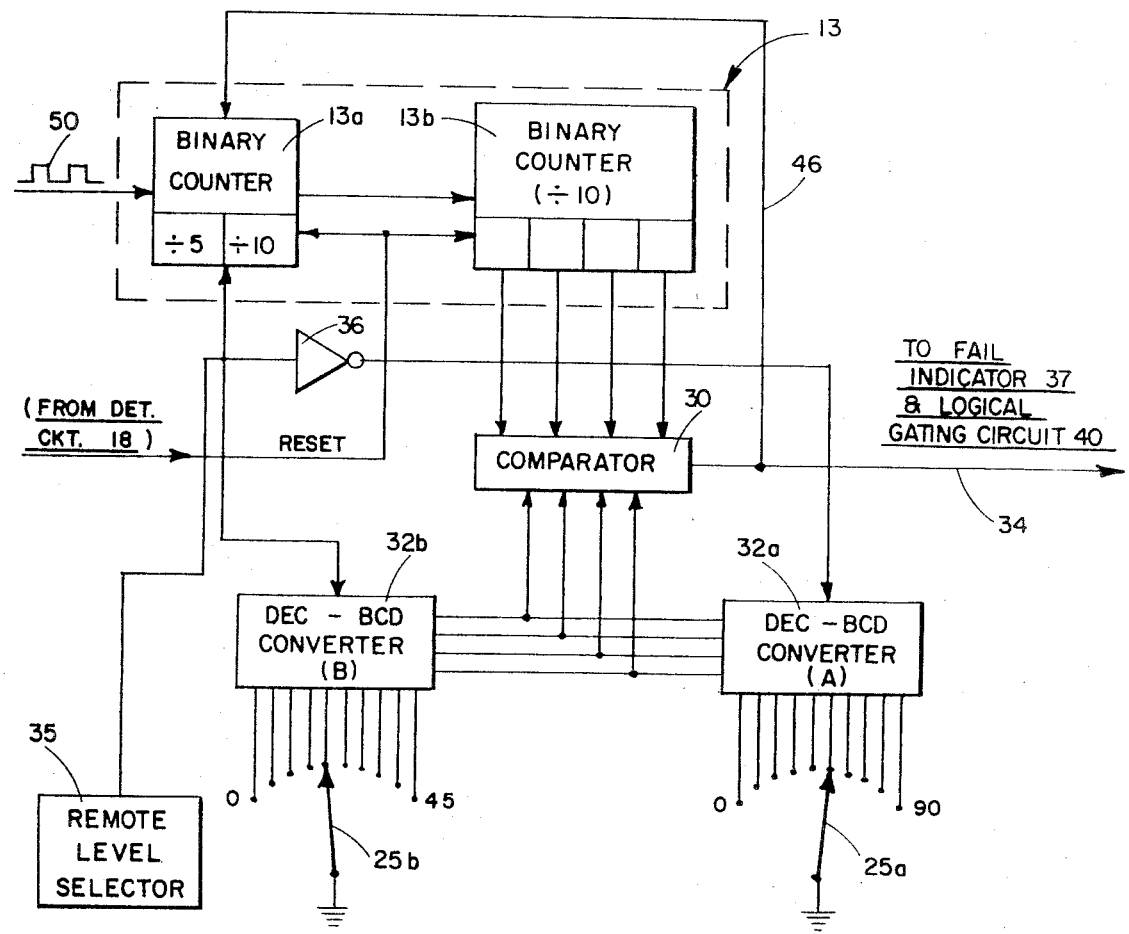
FIG. 2 is a schematic drawing illustrating one embodiment of a counter comparator and timing selector that may be utilized in the system of the invention.

Timing limit selector 25 which may comprise a rotary selector switch as to be described in connection with FIG. 2, is set to represent a time interval which exceeds the maximum expected time interval between vehicles on the street in which the sensors are installed. Thus, in the setting of timing limit selector 25, the assumption is made that if the timing interval between successive sensor outputs reaches the time set on the selector, this can only be due to a failure of the sensor. The outputs of primary counter 13 and secondary counter 14 are fed to comparators 30 and 31 respectively, the output of timing limit selector 25 also being fed to these comparators. In the event that the count of primary counter 13 reaches the timing limit set on selector 25, comparator 30 generates a "fail" output signal on line 34. This "fail" signal is fed to primary fail indicator 37, which may comprise an indicator lamp or a warning buzzer. The output on line 34 is also fed to logical gating circuit 40 which, as to be explained more fully in connection with FIG. 3, automatically cuts off the signal from detector circuit 18 and feeds the output of detector circuit 19, which responds to secondary vehicle sensor 16, to output line 42.

Similarly, the output of secondary counter 14 is compared with the timing limit selector output in comparator 31, and in the event that the counter output reaches the selector output (indicative of a failure of secondary vehicle sensor 16) generates a "fail" signal on line 45. This signal on line 45 is also utilized to actuate secondary fail indicator 49 to provide a signal to logical gating circuitry 40 to prevent a detector output in response to the secondary vehicle sensor 16.

Inhibit signals are fed on lines 46 and 47 to inhibit the counts of primary counter 13 and secondary counter 14 respectively, when a coincidence signal is indicated in the associated comparator. This acts to effectively "lock" the counters with the setting of the timing limit selector once coincidence is reached therewith.

Referring now to FIG. 2, one implementation for the counter, comparator and timing limit selector circuits of the system of the invention is shown. For illustrative purposes, only the circuits associated with the primary vehicle sensor are shown, those for the secondary sensor being the same.

Timing pulses 50, which as already noted may be of the order of 1 pulse per minute, are fed to binary counter unit 13a of binary counter 13 where the pulses are alternatively either divided by 5 or by 10, depending upon the setting of level selector 35. Level selector 35 may be at a remote location and is also used to alternatively activate decimal to binary coded decimal converter 32a when the divide by 10 mode of counter 13a is in effect, or converter 32b when the divide by 5 mode is activated. Level selector 35 thus can be used to change the criterion for generating a "fail" signal at different periods when traffic conditions may be significantly different. While means for providing only two such remotely controlled alternative settings are shown in FIG. 2, it should be apparent that additional such settings could be provided should the particular application requirements so dictate.

The divided output of counter 13a is fed as in input to binary counter 13b which provides a divided by 10 binary output (in binary coded decimal form). Thus, for an illustrative example, with pulses 50 at the rate of one pulse per minute and counter 13a in a divide by 10 mode, outputs are fed from counter 13b to comparator 30 in binary coded decimal form which represents timing increments between zero and 90 minutes.

Switches 25a and 25b are set to selected positions which represent predetermined "failure" criteria between 0 and 90 and 0 and 45 minutes respectively. As already noted, either the setting of switch 25a or of 25b can alternatively be remotely selected by means of level selector 35. The selected outputs of switches 25a and 25b are fed to decimal to binary coded decimal converters 32a and 32b respectively, where by means of appropriate logical gating circuitry well known in the art, they are converted to binary coded decimal form. The output of level selector 35 is fed as a control signal directly to converter 32b and through inverter 36 to converter 32a to activate these converters in the alternative. The selected converter output is fed to comparator 30 for comparison with the output of counter 13b. When there is coincidence between these two outputs, the comparator generates a "fail" signal which is fed to line 34. With the generation of such a "fail" signal an "inhibit" signal is fed on line 46 to binary counter 13a to inhibit any further count and to effectively "lock" the counters at the count at which coincidence occurs in the comparator.

Thus, for example, with the switch contacts of switch 25a each representing 10 minute increments and with the setting of the switch as illustrated in FIG. 2 at "50", a "fail" signal will be generated when there has been no vehicle sensing signal from the primary vehicle sensor for 50 minutes.

Figure 3:
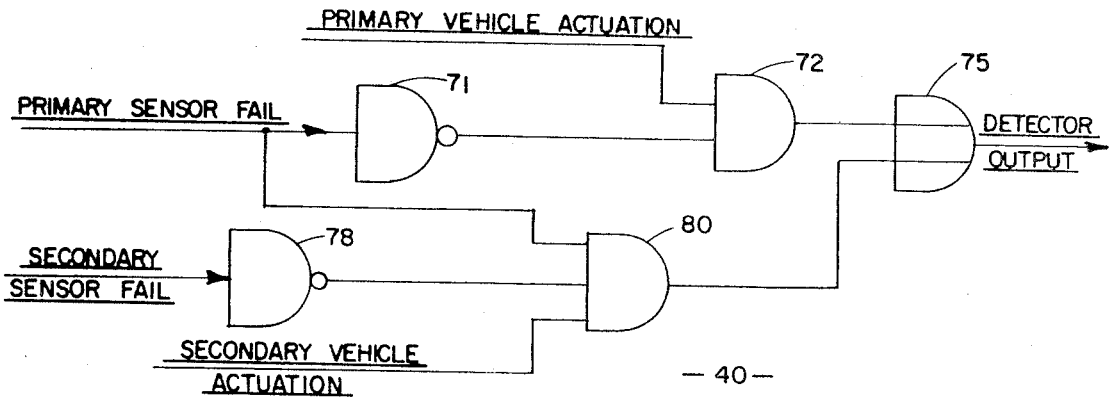
FIG. 3 is a schematic drawing illustrating logical gating circuitry which may be utilized in the system of the invention.

Referring now to FIG. 3, a typical gating circuit is shown which may be utilized to implement the functions of logical gating circuit 40. Primary sensor "fail" signals at a "high" level from comparator 30 are inverted in inverter 71, the inverted signal being fed to AND gate 72. Thus, when there is no primary sensor "fail" signal present, AND gate 72 will pass the primary vehicle actuation signal to OR gate 75 which provides a detector output. Of course, when there is a primary sensor fail signal present, inverter 70 will produce a "low" output to AND gate 72, and this gate will inhibit the passage of the primary vehicle actuation signal. The secondary sensor fail signal is inverted by means of inverter 78 and thence fed to AND gate 80. AND gate 80 also receives the secondary vehicle actuation signals and the primary sensor "fail" signals. Gate 80 will therefore pass the secondary vehicle actuation signals through to OR gate 75 only when the primary sensor "fail" signal is present and the secondary sensor "fail" signal is not. Thus, it can be seen that the detector circuit output will be in response to the primary sensor signal until such sensor fails, in which case the secondary sensor will take over with all output from the primary sensor being cut off.

The system of this invention thus provides highly effective means utilizing logical digital control circuitry for automatically providing a secondary or back up vehicle sensor signal, should the primary vehicle sensor fail, thus avoiding malfunction of a traffic control system.

While the system of this invention has been described and illustrated in detail, it is to be clearly understood that this is intended by way of illustration and example only and is not intended by way of limitation, the spirit and scope of this invention being limited only by the terms of the following claims.

I claim:
1. A fail safe vehicle detection system comprising:
vehicle sensor means for generating pulse signals in accordance with vehicle sensed thereby,
a timing pulse source,
counter means for counting the output of said pulse source,
means for providing signals for resetting said counter means to zero in response to the output of said sensor means,
timing limit selector means for selecting a predetermined timing interval which is greater than the maximum timing interval expected between vehicles actuating said sensor,
comparator means for comparing the output of said counter means with the output of said timing limit selector means and for generating a "fail" control signal when coincidence between said outputs is reached, and
logical gating circuit means responsive to the output of said comparator means for providing an output in accordance with said vehicle sensor means signals solely when said comparator means is not generating a "fail" control signal.

2. The system of claim 1 and further including means responsive to the output of said comparator means for inhibiting the counting of said counter means when said coincidence condition is reached.

3. The system of claim 1 and further comprising indicator means for generating a "fail" indication in response to said "fail" control signal.

4. The system of claim 1 wherein said counter means comprises a binary counter having predetermined outputs indicating successively higher counts, said selector means comprising a selector switch having predetermined positions corresponding to predetermined outputs of said counter and said comparator means includes a comparator for comparing each of said corresponding counter and switch position outputs for a coincidence condition.

5. The system of claim 1 wherein said timing limit selector means includes a plurality of selector switches each set to a predetermined different timing interval and remote selector means for alternatively feeding one of the selector switch outputs to said comparator means.

6. A fail safe vehicle detection system comprising:
primary and secondary vehicle sensor means for generating pulse signals in accordance with vehicles sensed thereby,
a timing pulse source,
primary and secondary counter means for counting the output of said pulse source,
means for providing signals for resetting said primary and secondary counters to zero in response to the outputs of said primary and secondary vehicle sensors respectively,
timing limit selector means for selecting a predetermined timing interval which is greater than the maximum timing interval expected between vehicles actuating said sensors,
comparator means for separately comparing the outputs of said primary and secondary counter means respectively, with the output of said timing selector means and for generating a "fail" control signal when coincidence between the compared signals is reached,
logical gating circuit means responsive to the outputs of said comparator means for alternatively providing an output in accordance with the primary sensor means signals when there is not a "fail" output from the comparator means associated therewith and an output in accordance with the sensor signals for the secondary vehicle sensor means when there is a "fail" signal from the comparator means associated with the primary sensor and there is not a "fail" output from the comparator means associated with the secondary sensor.

7. The system of claim 6 and further including means responsive to the outputs of said comparator means for inhibiting the counting of the associated counter means when said coincidence condition is reached.

8. The system of claim 6 and further comprising indicator means for generating "fail" indications in response to said "fail" control signals.

9. The system of claim 6 wherein each of said counter means comprises a counter having predetermined outputs indicating successively higher counts, said selector means comprising a selector switch having predetermined positions corresponding to predetermined outputs of said counter and a comparator for comparing each of the corresponding counter and switch position outputs for a coincidence condition.

* * * * *